April 3, 1951        E. T. MAY        2,547,335

FISH STRINGER

Filed July 10, 1946

Inventor

E. T. May

By CA Knowles, Attorneys

Patented Apr. 3, 1951

2,547,335

UNITED STATES PATENT OFFICE 2,547,335

FISH STRINGER

Elwood T. May, Shreveport, La.

Application July 10, 1946, Serial No. 682,626

1 Claim. (Cl. 24—161)

This invention relates to fish stringers, the primary object of the invention being to provide a stringer which will be of a size and capacity to string a large number of fish and at the same time be so constructed that it will be exceptionally strong to withstand the weight of the fish strung thereon.

An important object of the invention is to provide a stringer of this character having a keeper formed with side wings or flanges, constructed to guide the pointed end of the prong or stringer into position under the keeper to hold the fish on the stringer.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
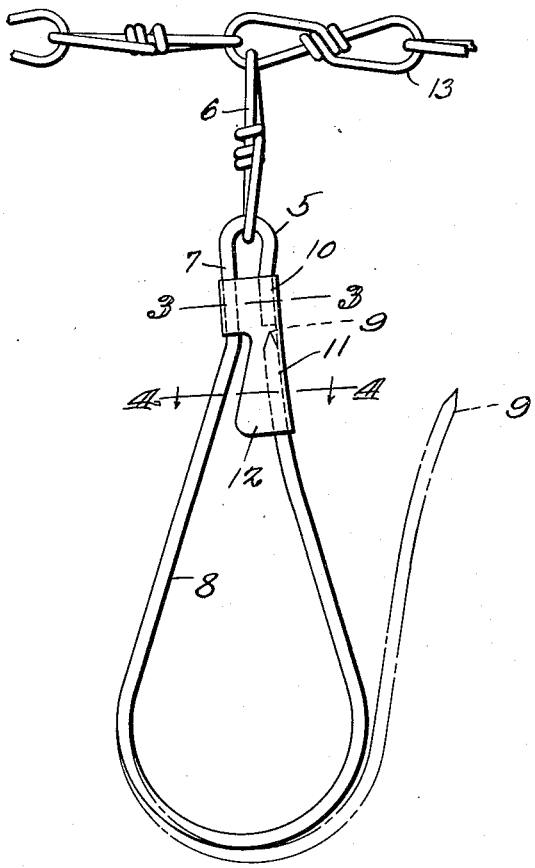
Figure 1 is an elevational view of a fish stringer, constructed in accordance with the invention.
Figure 2:
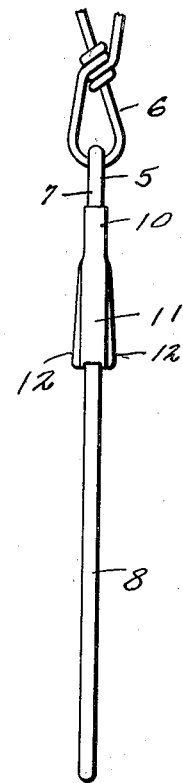
Figure 2 is an edge elevational view thereof.

Referring to the drawing in detail, the fish stringer comprises a length of heavy wire material bent at a point adjacent to one end thereof providing a loop 5 to which a chain link such as indicated at 6 is secured.

The length of wire is formed with a substantially straight portion 7 that is substantially parallel to the bent end, and below which the length of wire merges into an enlarged hook 8, the end of the hook 8 being pointed as at 9 to permit the hook to be readily extended through the gills of a fish in stringing the fish. The length of wire is bent outwardly below the straight portion, so as to constitute means for preventing movement away from the loop or eye, of a guide plate to be described hereinafter.

Figure 3:
Figure 3 is a sectional view taken on line 3—3 of Fig. 1.

The reference character 10 indicates said guide, formed from a metal plate which, as seen from Figure 3, is tubular in blank. This is clamped around the straight portion 7 and end of the loop 5, as clearly shown by Fig. 3 of the drawing, thereby holding the loop against spreading under the weight of fish strung on the device. When so clamped, the side plate provides in effect two integrally joined tubular elements receiving the straight portion 7 and opposed parallel end, respectively.

Figure 4:
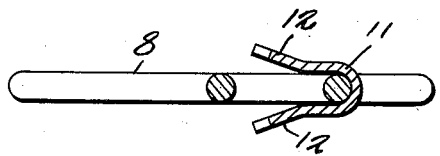
Figure 4 is a sectional view taken on line 4—4 of Fig. 1.

This metal plate 10 is formed with a wide offset portion 11 that is bent upon itself as shown by Fig. 4 of the drawing, providing a keeper into which the pointed end 9 of the hook 8 is extended, when the hook is closed.

Portions of the metal plate 10 extend outwardly, providing ears 12, which are so located with respect to the hook 8, that the space between the ears 12 and hook 8, will be guarded to prevent accidental displacement of the pointed end of the hook, from the keeper. This is by reason of the fact that the side edges of the ears 12 remain parallel to and closely spaced from the outwardly bent portion of the wire material disposed below the guide, the width of the keeper increasing toward its free end. Thus, should the pointed end 9 of the hook accidentally be urged slightly to the left from its full line position in Figure 1, said pointed end will cross the outwardly bent portion 8 while still being disposed between the ears 12. As a result, said outwardly bent portion of the wire material assists in providing a stop against accidental lateral movement of the pointed end 9 in one direction. Additionally, said outwardly bent portion of the wire material aids in insertion of the pointed end 9 in the keeper when the hook is being closed, since it provides a stop against or along which the pointed end 9 is slid during insertion in the keeper. These ears also afford means to guide the hook end of the hook 8, within the keeper when the hook is loaded with fish and it becomes a difficult matter to close the stringer.

The reference character 13 indicates the chain with which the stringer is used, and which is provided to allow the fish on the stringer, to remain in the water.

As may be noted by reference to Fig. 1, one side of the loop 5, shown as the right hand side in this figure, is inclined outwardly relative to the end of the length of wire material disposed immediately therebelow, which end is encased in the right hand tubular part of the guide 10. This provides a positive means for preventing upward movement of the guide relative to the wire material. Meanwhile, the portion of the wire material extending through the left hand tubular part of the guide as seen in Fig. 1 is inclined outwardly in the opposite direction immediately below said guide. This prevents downward movement of the guide relative to the wire material. Thus, to summarize the arrangement of the guide and wire material gripped thereby, the tubular guide construction prevents removal of the guide from the wire material; the inclined wire portion extending from one end of one of the tubular sides of the guide prevents slippage in one direction of the guide; and the oppositely inclined wire portion extending from the opposite end of the other tubular guide prevents slippage of the guide relative to the wire material in the other direction.

What is claimed is:

A fish stringer comprising a length of wire material bent upon itself adjacent one end to provide a loop for receiving a supporting element, one side portion of said loop immediately above said end being inclined outwardly relative to said end of the wire material, there being a straight portion of said material below the loop substantially parallel to said end and integral with the other side of the loop, a tubular guide clamped to said straight portion and said end below the loop, said inclined loop portion preventing slippage of the tubular guide in one direction, the opposite end of the wire material being bent upon itself to provide an enlarged open hook, one side of said opposite end being integral with said straight portion and being inclined relative to said straight portion oppositely to the direction of inclination of said loop portion and extending in a direction from said guide opposite to said inclined loop portion to prevent slippage of the guide on said wire material in the other direction, and ears integral with said tubular guide and proportioned to receive the last-named end of said wire material.

ELWOOD T. MAY.

REFERENCES CITED

The following references are of record in the file of this patent:

UNITED STATES PATENTS

| Number | Name | Date |
|---|---|---|
| 403,608 | Pickard et al. | May 21, 1889 |
| 1,235,854 | Stapf | Aug. 7, 1917 |
| 1,279,080 | Breunig | Sept. 17, 1918 |
| 2,007,090 | Jordan | July 2, 1935 |